US011146778B2

(12) United States Patent
Iwasa

(10) Patent No.: US 11,146,778 B2
(45) Date of Patent: Oct. 12, 2021

(54) SYNCHRONIZATION CONTROL DEVICE AND SYNCHRONIZATION CONTROL METHOD

(71) Applicant: CANON KABUSHIKI KAISHA, Tokyo (JP)

(72) Inventor: Takeshi Iwasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/785,053

(22) Filed: Feb. 7, 2020

(65) Prior Publication Data

US 2020/0267376 A1   Aug. 20, 2020

(30) Foreign Application Priority Data

Feb. 18, 2019 (JP) .............................. JP2019-026496

(51) Int. Cl.
*H04N 13/296* (2018.01)
*G09G 5/12* (2006.01)
*G02B 27/01* (2006.01)

(52) U.S. Cl.
CPC ......... *H04N 13/296* (2018.05); *G02B 27/017* (2013.01); *G09G 5/12* (2013.01); *G02B 2027/0178* (2013.01); *G09G 2310/08* (2013.01)

(58) Field of Classification Search
CPC ....... G02B 27/017; G09G 5/12; H04N 13/296
See application file for complete search history.

(56) References Cited

U.S. PATENT DOCUMENTS

| 2016/0198105 | A1* | 7/2016 | Kawai ................... G03B 17/20 348/251 |
| 2017/0237882 | A1* | 8/2017 | Shiohara .................. G09G 5/18 348/148 |
| 2017/0370677 | A1* | 12/2017 | Rutkiewicz .............. H04N 5/30 |

FOREIGN PATENT DOCUMENTS

| JP | 2006-5608 A | 1/2006 |
| JP | 2017-060078 A | 3/2017 |
| JP | 2017-169111 A | 9/2017 |

* cited by examiner

*Primary Examiner* — Obafemi O Sosanya
(74) *Attorney, Agent, or Firm* — Canon U.S.A., Inc. IP Division

(57) ABSTRACT

A synchronization control device includes a detection unit configured to detect at least one of a position and an orientation of the device in a three-dimensional space. The synchronization control device includes one or more image pickup elements, and a control unit configured to control such that a phase of an image capturing timing of the one or more image pickup elements is synchronized with a phase of a detection timing of the detection unit, and a cycle length of the image capturing timing is equal to a cycle length of the detection timing or an integral multiple of the cycle length of the detection tuning.

17 Claims, 4 Drawing Sheets

SYNCHRONIZATION CONTROL DEVICE AND SYNCHRONIZATION CONTROL METHOD

BACKGROUND

Field of the Disclosure

The present disclosure relates to synchronization control technology for synchronizing devices for performing image capturing or display.

Description of the Related Art

As a technique for fusing a real space and a virtual space seamlessly in real time, a mixed reality (MR) technology has been known. In an MR system using a video see-through type head mounted display (HMD), a composite image in which a real space image captured by an imaging unit included in the HMD is overlapped with a computer graphics (CG) image is provided to an HMD wearer for viewing. Each of the real space image and the CG image consists of images independently for a right eye and a left eye. Therefore, the HMD wearer can view an MR space created with stereoscopic moving images.

In a system like the MR system where high-definition and high-precision moving images are dealt with, a device for dealing with orientation information is used in addition to an imaging device and a display device. Therefore, it is desired that these devices operate in synchronization as much as possible.

Japanese Patent Application Laid-Open No. 2006-5608 discusses a synchronization method that deals with a case where a plurality of imaging devices has different exposure time periods. Further, Japanese Patent Application Laid-Open No. 2017-169111 discusses a control method for controlling exposure timings between imaging devices having different imaging conditions.

In the MR system, it is necessary that not only the imaging devices but also the display device and the device dealing with the orientation information be synchronized with high precision. However, Japanese Patent Application Laid-Open No. 2006-5608 and Japanese Patent Application Laid-Open No. 2017-169111 only discuss how to synchronize imaging devices with each other. Therefore, even by adopting the techniques discussed in Japanese Patent Application Laid-Open No. 2006-5608 and Japanese Patent Application Laid-Open No. 2017-169111 to the MR system, it is not possible to attain sufficient synchronization precision for such CG overlapping, so that stuttering of a long second period would possibly occur.

SUMMARY

According to an aspect of the present disclosure, a device includes one or more image pickup elements, a detection unit configured to detect at least one of a position and an orientation of the device in a three-dimensional space, and a control unit, wherein the control unit is configured to perform such control that a phase of an image capturing timing of the one or more image pickup elements is synchronized with a phase of a detection timing of the detection unit, and a cycle length of the image capturing timing is equal to a cycle length of the detection timing or an integral multiple of the cycle length of the detection timing.

Further features of the present disclosure will become apparent from the following description of exemplary embodiments with reference to the attached drawings.

DESCRIPTION OF THE EMBODIMENTS

Figure 1A:
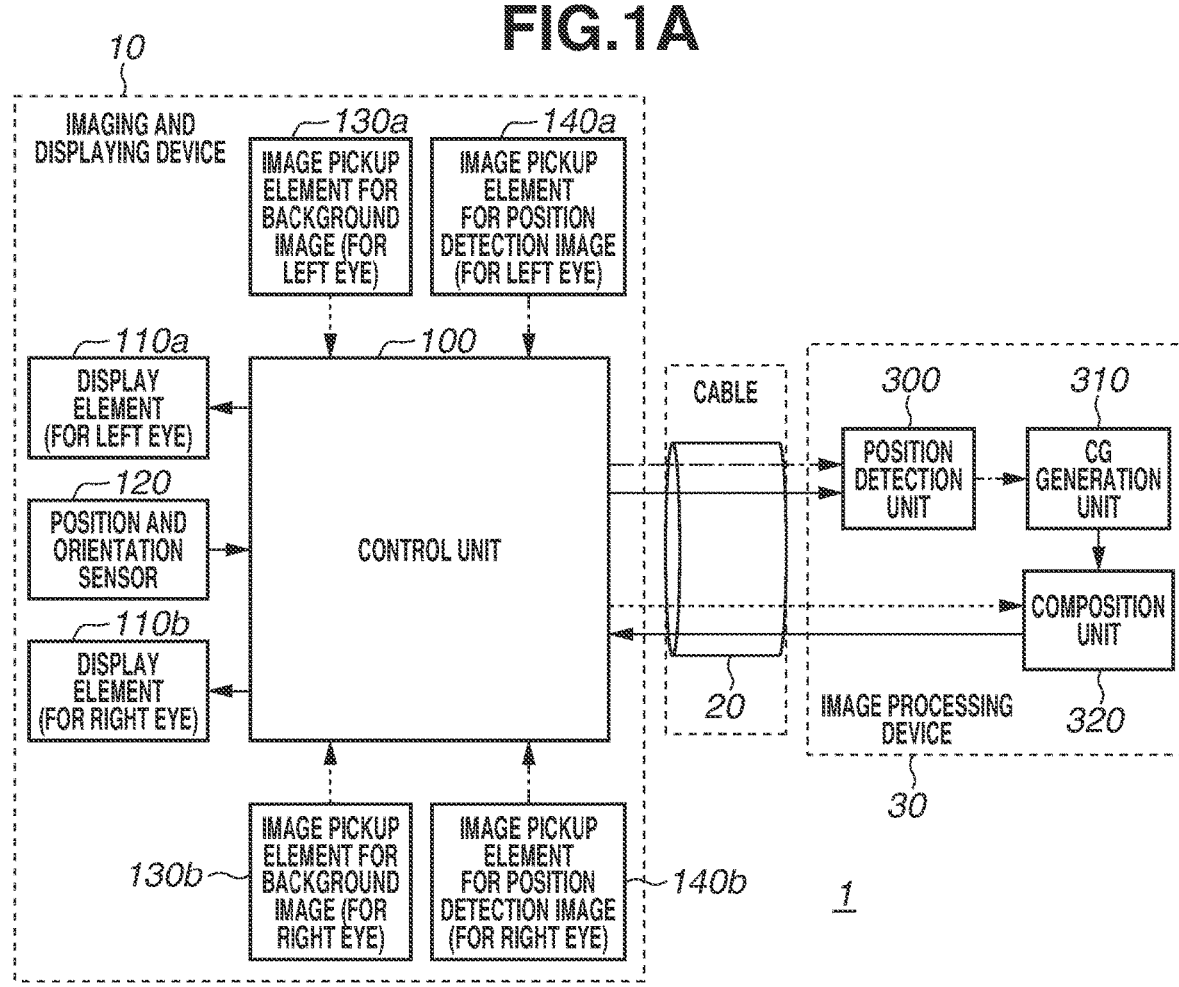
FIG. 1A and FIG. 1B are a block diagram and a schematic diagram illustrating a schematic configuration of an imaging and displaying system, respectively.

In the following, the present disclosure will be described based on exemplary embodiments thereof, referring to the drawings. It should be noted that configurations described in the exemplary embodiments below are merely examples, and the present disclosure is not limited to the configurations illustrated in the drawings.

A first exemplary embodiment will be described based on a system including an imaging device and a displaying device, and further including a device dealing with orientation information, like a head mounted display (HMD) system, for example.

Figure 1B:
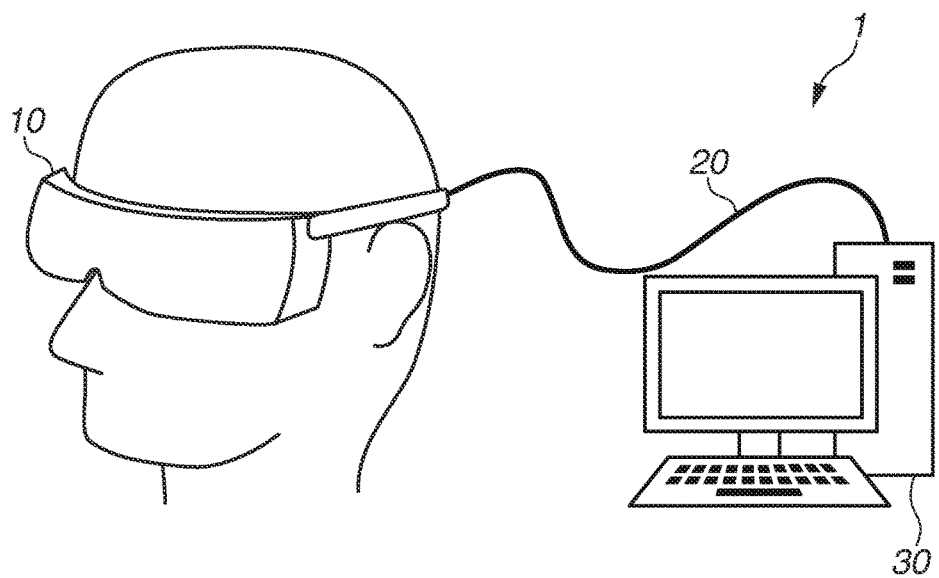

FIG. 1A is a system block diagram illustrating an exemplary configuration of an imaging and displaying system 1 as one example to which a synchronization control device according to the present exemplary embodiment is applicable. The imaging and displaying system 1 according to the present exemplary embodiment includes an imaging and displaying device 10 and an image processing device 30, which are connected with each other via, for example, a cable 20. FIG. 1B is a schematic diagram illustrating an outer appearance of the imaging and displaying system 1, illustrating one example of a state where a user wears the imaging and displaying device 10.

The imaging and displaying device 10 is a head-mounted type display device, and will be referred to as the HMD 10 in the following explanation.

The image processing device 30 is a personal computer work station (PCWS) configured to generate an image of mixed-reality (MR) space in which a real space and a virtual space are fused together (hereinafter, this image is referred to as a composite image), and to provide the composite image to the HMD 10. The case illustrated in FIG. 1A and FIG. 1B is configured such that a transmission path between the HMD 10 and the image processing device 30 is a wired connection established by the cable 20, but the communication path can be a wireless connection. In the following explanation, the user wearing the HMD 10 will be referred to as an HMD wearer.

The HMD 10 includes image pickup elements 130a, 130b, 140a, and 140b, display elements 110a and 110b, a position and orientation sensor 120, and a control unit 100 as its constituent elements.

The image pickup elements 130a, 130b, 140a, and 140b are image sensors such as a complementary Metal Oxide Semiconductors (CMOSs) sensor, a Charge Coupled Devices (CCDs) sensor, or the like. The image pickup elements 130a, 130b, 140a, and 140b respectively have an imaging surface on which an optical image of a real space is formed thereon via an optical system (not illustrated). In terms of exposure time, sensor gain, exposure start timing, and the like, they are set to the image pickup elements 130*a*, 130*b*, 140*a*, and 140*b* based on a control signal from the control unit 100. That is, the image pickup elements 130*a*, 130*b*, 140*a*, and 140*b* are configured to perform image capturing based on the exposure time, sensor gain, exposure start timing, etc. set by the control unit 100, thereby obtaining captured images of the real space. Information of the captured images is sent to the control unit 100. The control unit 100 is configured to add, to the information of the captured images, time stamp information that is time information regarding an image capturing timing in an exposure time period.

The image pickup elements 130*a* and 130*b* are configured to capture background images, which will be a base of the composite image, and the image pickup elements 140*a* and 140*b* are configured to capture position detection images, which will be utilized in generating a computer graphics (CG) image described below. The background images and the position detection images are different in angle of required view, resolution, and image processing. Therefore, in the present exemplary embodiment, the image pickup elements 130*a* and 130*b* capture the background images and the image pickup elements 140*a* and 140*b* capture the position detection images, so that a background image and a position detection image are captured by separate image pickup elements. As an alternative configuration, both of a background image and a position detection image can be clipped from a captured image captured by an image pickup element.

In the imaging and displaying system 1 according to the present exemplary embodiment, a stereoscopic image using an image for a right eye and an image for a left eye is dealt with. Accordingly, the image pickup elements 130*a* and 130*b* are paired respectively for the right eye and left eye, so that the image pickup element 130*a* captures a background image for the left eye and the image pickup element 130*b* captures a background image for the right eye. Similarly, the image pickup elements 140*a* and 140*b* are paired respectively for the right eye and the left eye, so that the image pickup element 140*a* captures a position detection image for the left eye and the image pickup element 140*b* captures a position detection image for the right eye. The detailed explanation of a technique for the image capturing for stereoscopic images is omitted here, since the technology has been well-known.

The display elements 110*a* and 110*b* are display devices such as organic light-emitting diodes (OLED) display, liquid crystal display (LCD), or the like. The display elements 110*a* and 110*b* are configured to display a composite image generated by the image processing device 30 as described below. The composite images displayed on the display elements 110*a* and 110*b* are presented to the HMD wearer via an optical system (not illustrated). Further, the display elements 110*a* and 110*b* are paired respectively for the right eye and the left eye, because the imaging and displaying system 1 according to the present exemplary embodiment deals with a stereoscopic image using an image for the right eye and an image for the left eye. The display element 110*a* is configured to display a composite image for the left eye and the display element 110*b* is configured to display a composite image for the right eye. The detailed explanation of a technique for the displaying for stereoscopic images is omitted here, since the technology has been well-known.

The position and orientation sensor 120 is a sensor configured to detect a position and an orientation of the HMD 10 in the real space, which is a three-dimensional space, and is configured to output detection information regarding the position and the orientation of the HMD 10 in the three-dimensional space hereinafter, this information is referred to as position and orientation information). The position and orientation information thus obtained by the position and orientation sensor 120 is sent to the control unit 100. The control unit 100 adds, to the position and orientation information, time stamp information that is time information regarding a detection timing. The explanation of a technology for detecting the position and orientation of the HMD 10 in the three-dimensional space is omitted here, since the technique has been well-known.

The control unit 100 is configured to perform appropriate image processing of the captured images and appropriate image processing of display images, and to control all the constituent elements other than itself in the HMD 10. Further, the control unit 100 is configured to control for a cooperative operation between the HMD 10 and the image processing device 30. The control unit 100 is configured to send, to the image processing device 30, the information of the background images and the position detection images thus captured, and the position and orientation information, and to receive information of composite images sent from the image processing device 30.

The image processing device 30 includes a position detection unit 300, a CG generation unit 310, and a composition unit 320 as constituent elements.

The position detection unit 300 is configured to detect, based on the position detection images and the position and orientation information of the HMD 10 sent from the HMD 10, a position where to composite a CG image with the real space images of the real space, and information necessary to generate the CG image such as an angle of a line of sight of the HMD wearer. The information detected by the position detection unit 300 is sent to the CG generation unit 310. The detailed explanation of a technique by which the position detection unit 300 detects the position and the line of sight is omitted here, since the technology has been well-known.

The CG generation unit 310 is configured to generate a CG image for the right eye and a CG image for the left eye based on the information sent from the position detection unit 300. The CG images are generated by rendering based on CAD data (not illustrated) stored in a hard disc drive (HDD) in the image processing device 30, or the like. The detailed explanation of a technique for generating the CG images is omitted here, since the technology has been well-known.

The composition unit 320 is configured to generate a composite image for the right eye by overlapping the CG image for the right eye generated by the CG generation unit 310 onto the background image for the right eye sent from the HMD 10. Further, the composition unit 320 is configured to generate a composite image for the left eye by overlapping the CG image for the left eye generated by the CG generation unit 310 onto the background image for the left eye sent from the HMD 10. After that, the image processing device 30 outputs information of the composite images respectively for the right eye and the left eye to the HMD 10, which has been generated by the composition unit 320, as information for display images, respectively.

The control unit 100 of the HMD 10 is configured to cause the display element 110*a* for the left eye to display the display image, which is the composite image for the left eye, and to cause the display element 110*b* for the right eye to display the display image, which is the composite image for the right eye. As a result of this, it becomes possible for the HMD wearer to observe, based on a stereoscopic moving image, a stereoscopic MR space in which the real space and the virtual space are fused.

Figure 2:
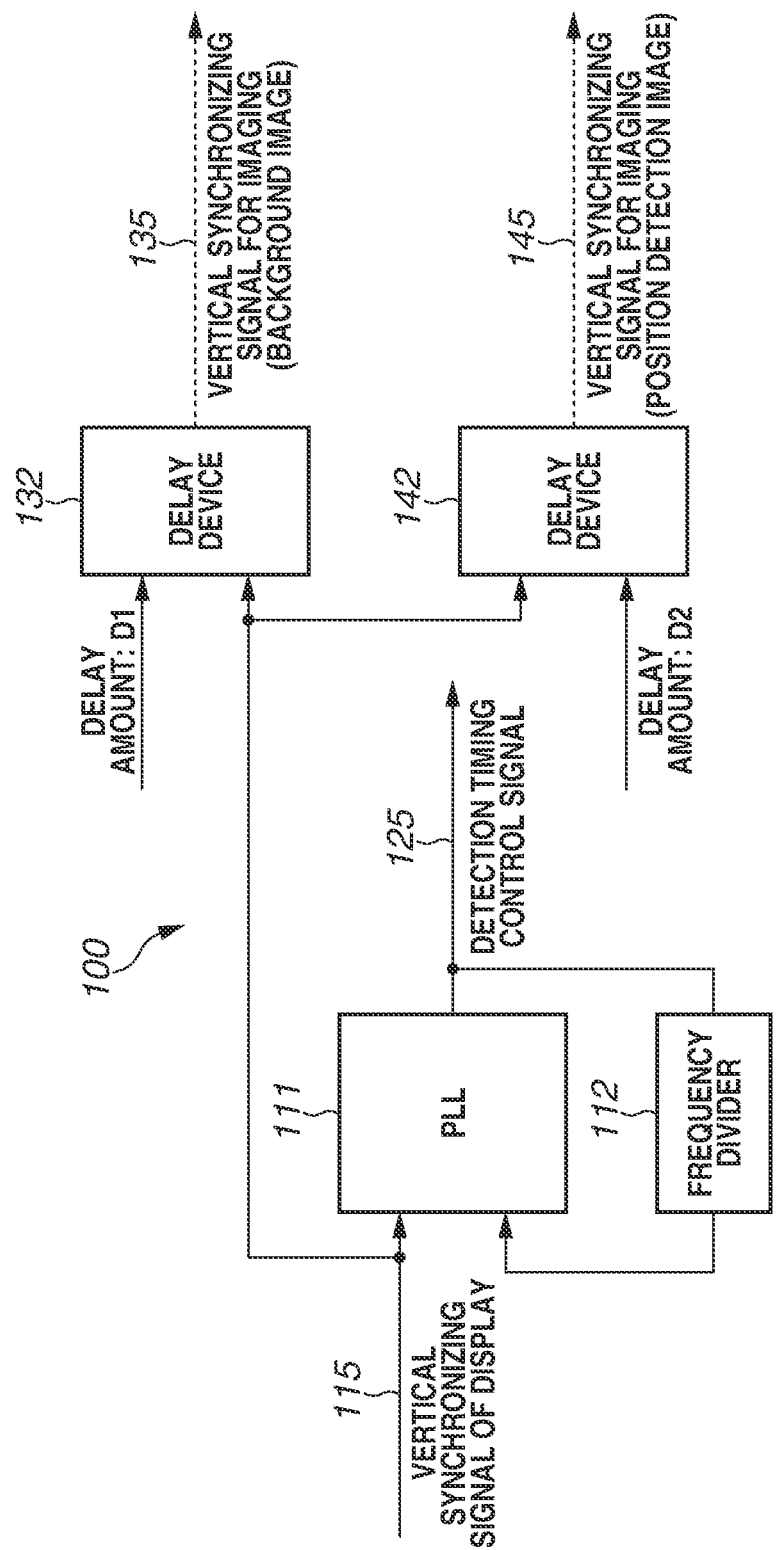
FIG. 2 is a diagram illustrating an exemplary configuration for synchronization control of a control unit of an imaging and displaying device.
Figure 3:
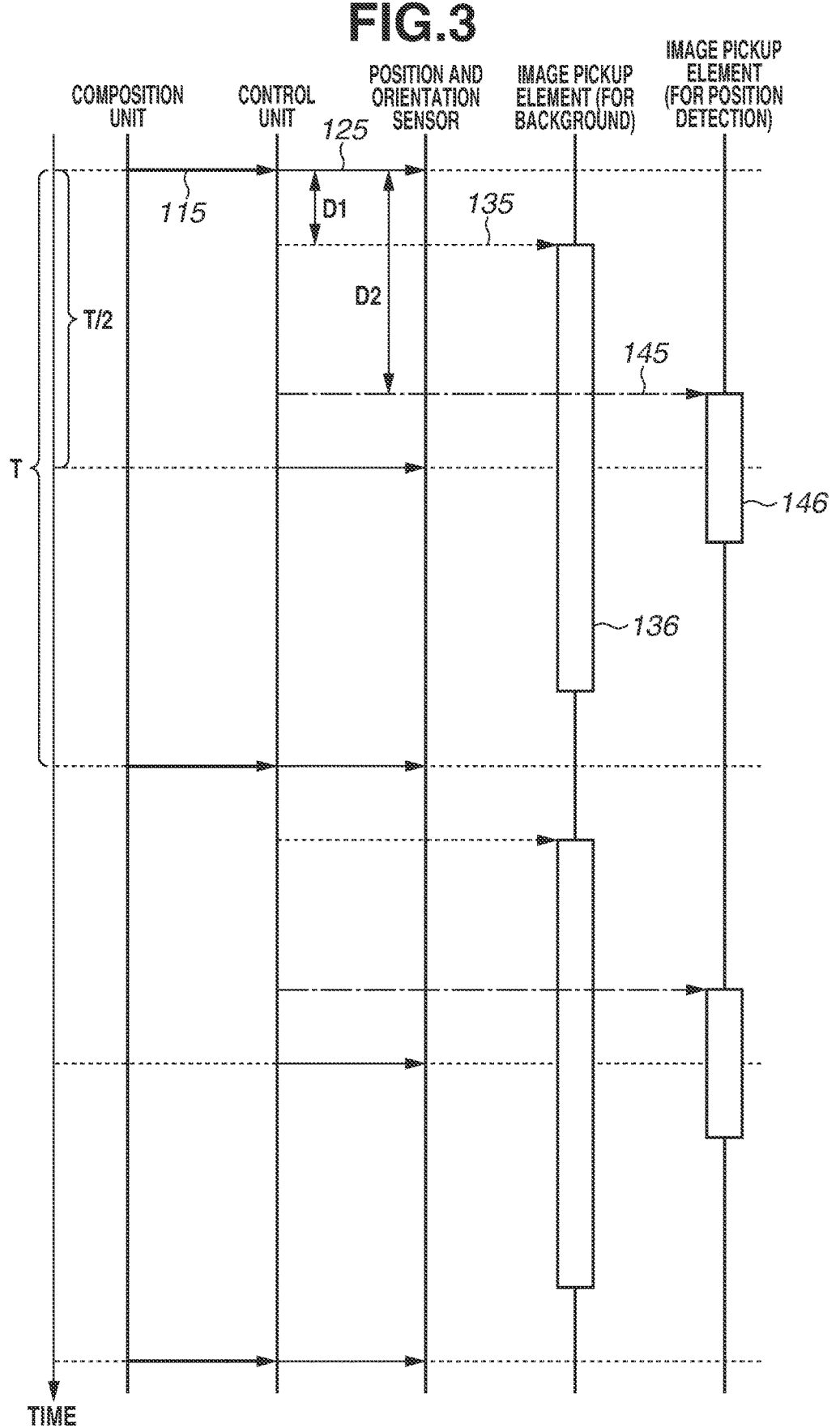
FIG. 3 is a time chart for explaining the synchronization control of the imaging and displaying system.

FIG. 2 is a block diagram illustrating one exemplary configuration for generating a timing signal for the control performed by the control unit 100 to control the constituent elements in the HMD 10 illustrated in FIG. 1. The constituent elements in the control unit 100 illustrated in FIG. 2 can be constituted as hardware such as circuits or the like, or can be constituted as software modules realized by execution of a program(s) by a central processing unit (CPU) or the like. As an alternative, the constituent elements in FIG. 2 can be such that one or some of the constituent elements are constituted as hardware and the rest of the constituent elements is constituted as software modules. FIG. 3 is a time chart illustrating a relationship between a timing based on signals in FIG. 2 described below, and an operational timing of main constituent elements in the HMD 10 and the image processing device 30 in FIG. 1. Hereinafter, referring to FIGS. 2 and 3, in-system synchronization in the imaging and displaying system 1 according to the present exemplary embodiment will be described.

The composition unit 320 of the image processing device 30 is configured to output a vertical synchronizing signal of display 115, which is to be input to the control unit 100 of the HMD 10. The vertical synchronizing signal of display 115 is a signal indicative of a frame head of each image frame. If, for example, the image frames have a frame rate of 60 [Hz], a frame cycle T will be about 16.67 [ms], which is a reciprocal number of the frame rate.

In the present exemplary embodiment, the vertical synchronizing signal of display 115 is input to a phase-locked loop (PLL) circuit 111 in the control unit 100, as illustrated in FIG. 2. The PLL circuit 111 is configured to generate a detection timing control signal 125 that is in phase synchronization with the vertical synchronizing signal of display 115. The example illustrated in FIG. 2 is so configured that an output of the PLL circuit 111 is fed back via a frequency divider 112, so that a cycle length of the detection timing control signal 125 is determined based on a frequency dividing ratio of the frequency divider 112 for feeding back the output of the PLL circuit 111. In the present exemplary embodiment, the frequency dividing ratio of the frequency divider 112 is 2, and therefore the cycle length of the detection timing control signal 125 is T/2. The detection timing control signal 125 is sent to the position and orientation sensor 120. Thus, the position and orientation sensor 120 outputs position and orientation information detected or updated, upon receiving the detection timing control signal 125. The position and orientation information is sent to the control unit 100.

In the present exemplary embodiment, the vertical synchronizing signal of display 115 is also sent to delay devices 132 and 142 as illustrated in FIG. 2. The delay device 132 is set to a delay amount D1 with respect to the vertical synchronizing signal of display 115, and the delay device 142 is set to a delay amount D2 with respect to the vertical synchronizing signal of display 115. Incidentally, the delay amounts D1 and D2 are calculated by the control unit 100 as described below.

The delay device 132 is configured to generate, based on the delay amount D1, a vertical synchronizing signal for imaging 135 for controlling the image pickup elements 130a and 130b for imaging the background images as described above. The delay device 142 is configured to generate, based on the delay amount D2, a vertical synchronizing signal for imaging 145 for controlling the image pickup elements 140a and 140b for imaging the position detection images as described above. The vertical synchronizing signal for imaging 135 is output to the image pickup elements 130a and 130b, and the vertical synchronizing signal for imaging 145 is output to the image pickup elements 140a and 140b.

With this configuration, the image pickup elements 130a and 130b perform exposure on an image capturing timing based on the vertical synchronizing signal for imaging 135 for an exposure time period of a time length indicated by an exposure time 136, thereby capturing the background images. Similarly, the image pickup elements 140a and 140b perform exposure on an image capturing timing based on the vertical synchronizing signal for imaging 145 for an exposure time period of a time length indicated by an exposure time 146, thereby capturing the position detection images.

The control unit 100 is configured to calculate out the delay amount D1 using the following Equation (1), based on a shutter speed S1 selected according to an environment in imaging the background image, that is the exposure time 136, and the frame cycle T of the vertical synchronizing signal of display 115 described above. Similarly, the control unit 100 is configured to calculate out the delay amount D2 using the following Equation (1), based on a shutter speed S2 selected according to an environment in imaging the position detection image, that is the exposure time 146, and the frame cycle T of the vertical synchronizing signal of display 115 described above. The delay amount D in the Equation (1) defines the delay amount D1 or D2, and the shutter speed S in the Equation (1) defines the shutter speed S1 or S2.

$$\text{Delay amount } D = (\text{Frame Cycle } T - \text{Shutter Speed } S)/2 \text{ [sec]} \quad (1)$$

For example, suppose that the frame rate is 60 [Hz] and the frame cycle T is 1/60 [sec] as exemplified above, and the shutter speed S is 1/90 [sec], for example, the delay amount D=(1/60−1/90)/2=approximately 2.78 [ms]. According to the Equation (1), for example, a point, which is referred to for phase-synchronization of the image capturing timing, is a certain central point of the exposure time period, and the central point of the exposure time period is in a reverse phase of the vertical synchronizing signal of display 115, that is, the phases of the detection timing control signal 125 and the image capturing timing are the same. This results in that the captured image based on time integration of the real space and the position and orientation information are precisely synchronized. Further, the cycle length of the image capturing timing becomes a cycle length equal to the cycle length of the detection timing or a fraction of this cycle length thus divided. The certain central point referred to for the phase-synchronization of the image capturing timing can be, besides the central point of the exposure time period, a centroid point of the exposure time period, or another point as appropriate as the central point or the centroid point.

In the present exemplary embodiment, the vertical synchronizing signal of display 115 is used as a signal for determining a display timing for the display elements 110a and 110b of the HMD 10. As described above, the position and orientation sensor 120 outputs the detected or updated position and orientation information according to the detection timing control signal 125 generated based on the vertical synchronizing signal of display 115. Accordingly, the phase of the detection timing is synchronized with the phase of the display timing of the display elements 110a and 110b, and the cycle length of the detection timing is equal to the cycle length of the display timing or a multiple thereof.

As an alternative, the point, which is referred to for the phase-synchronization of the display timing, can be a certain point such as a central point or a centroid of the display time period of the image frames.

As described above, according to the present exemplary embodiment, the phase of the image capturing timing is synchronized with the phase of the detection timing at which the position and orientation information is output, and the cycle length of the image capturing timing is equal to the cycle length of the detection timing or a fraction of this cycle length thus divided. Further, according to the present exemplary embodiment, the phase of the detection timing at which the position and orientation information is output is synchronized with the phase of the display timing, and the cycle length of the detection timing is equal to the cycle length of the display timing or a fraction of this cycle length thus divided. As a result of this, according to the present exemplary embodiment, the phase of the image capturing timing is synchronized with the phase or the reverse phase of the display timing, and the cycle length of the image capturing timing is equal to the cycle length of the display timing or a fraction of this cycle length thus divided. Therefore, according to the present exemplary embodiment, the updating cycle lengths of the display image and the captured image in the HMD 10 are synchronized with each other, and the display image and the position and orientation information are synchronized with each other.

If the shutter speed (that is, exposure time period) that is set according to a type of the image pickup elements is changed, the control unit 100 sets the delay amounts D1 and D2 to optimum values according to the different shutter speeds. Further, for example, if under an auto exposure (AE) operation, the control unit 100 updates the delay amounts D1 and D2 according to an update of the shutter speed. That is, the control unit 100 controls the image capturing timing in such a way that the relative relationship between the image capturing timing and the detection timing or between the phase and the cycle length of the display timing is maintained, in a case where the shutter speed is changed during imaging.

As described above, according the present exemplary embodiment, the control unit 100 controls the display timing, the image capturing timing and the detection timing in such a way that these three timings are synchronized with each other so that it is possible to precisely synchronize the captured image, the display image, and the position and orientation information with each other in the HMD 10. In the present exemplary embodiment, the captured image, the display image, and the position and orientation information are synchronized with each other, but the present exemplary embodiment is not limited to this example. The present exemplary embodiment is also applicable to cases where any one of the image pickup elements, display elements, and the position and orientation sensor is not provided, and to such modifications that various parameters in the design are changed as appropriate depending on usage purposes of the system configuration and the devices. For example, in a case where the position and orientation sensor is not provided, the control unit 100 performs such control that the phase of the image capturing timing is synchronized with the phase or the reverse phase of the display timing, and the cycle length of the image capturing timing is equal to the cycle length of the display timing or a fraction of this cycle length thus divided.

A second exemplary embodiment is an example in which a combination of different types of image pickup elements is provided, and synchronization of the captured image, the display image, and the position and orientation information is made possible. The second exemplary embodiment is similar to the first exemplary embodiment in terms of the overall system configuration, the basic configuration except the exposure time and the equation for calculating out the delay amount described in the first exemplary embodiment referring to FIG. 3, and the processing processes. Accordingly, detailed explanations thereof are omitted here.

Figure 4:
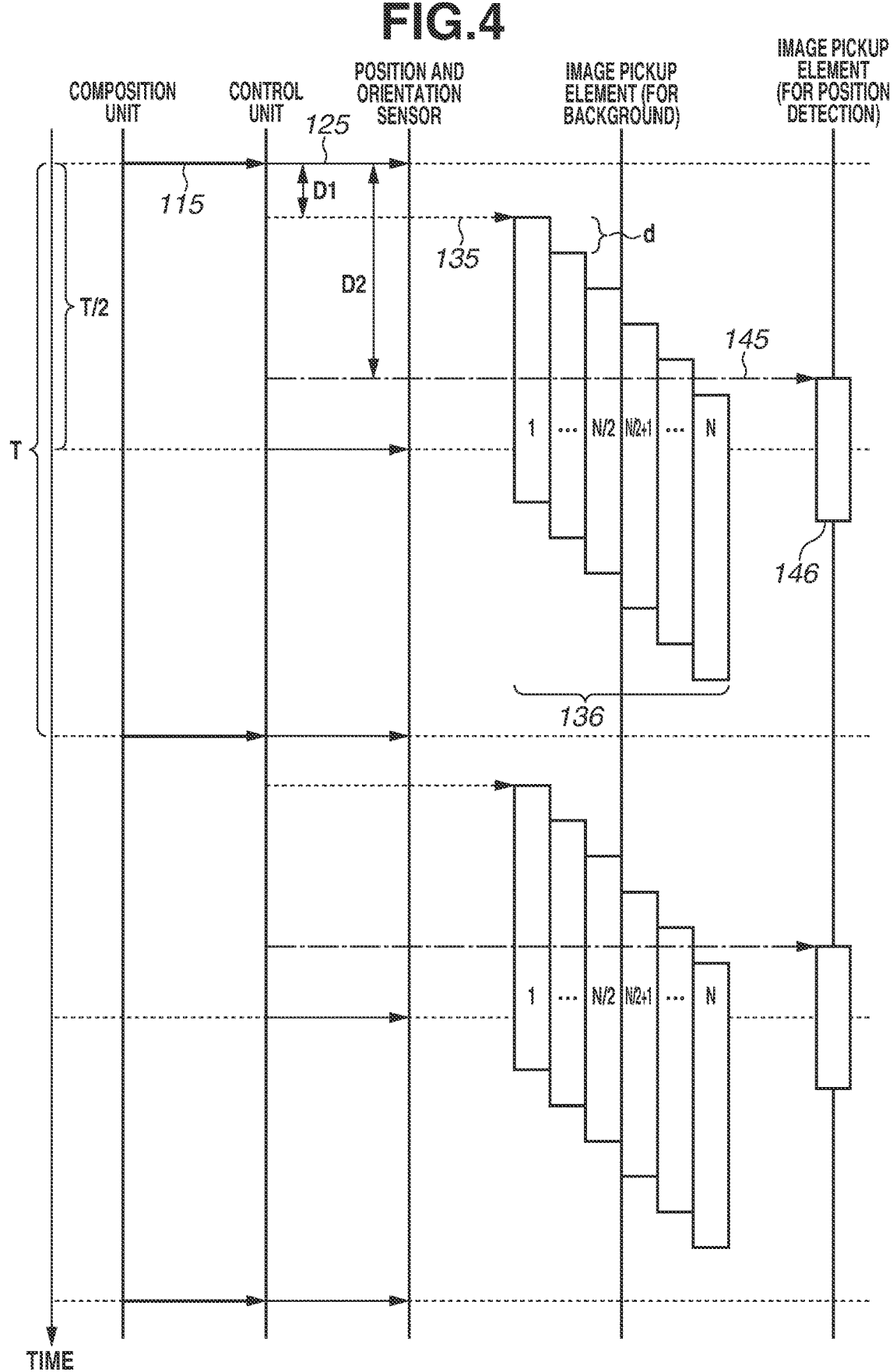
FIG. 4 is a time chart for explaining synchronization control of another embodiment of the imaging and displaying system.

FIG. 4 is a time chart in the second exemplary embodiment illustrating a relationship between timings based on the signals in FIG. 2 described above, and operation timings of main constituent elements in the HMD 10 and the image processing device 30 in FIG. 1. Hereinafter, referring to FIG. 2 described above and to FIG. 4, an in-system synchronization in the imaging and displaying system 1 according to the second exemplary embodiment will be described.

For example, assume that the first exemplary embodiment above is configured such that the image pickup elements 130a and 130b and the image pickup elements 140a and 140b are image pickup elements of a global shutter type. On the other hand, assume that the second exemplary embodiment is configured such that the image pickup elements 130a and 130b that images background images are image pickup elements of a rolling shutter type, and the image pickup elements 140a and 140b that images the position detection images are image pickup elements of the global shutter type. The image capturing timing etc. of the image pickup elements of the global shutter type are similar to those described in the first exemplary embodiment, and therefore the explanation thereof is not repeated here.

In the image pickup elements of the rolling shutter type, it is considered that the central point of the exposure time period on a line located nearly at the center of the captured image is the central point of the exposure time period of a whole captured image. Therefore, in the second exemplary embodiment, the control unit 100 calculates out a delay amount D with respect to the image capturing timing that refers to a certain point in the central point of the exposure time period on the line located nearly at the center of the captured image, and sets the delay amount D to the delay device 132. As illustrated in FIG. 4, the delay amount D is calculated using the following Equation (2) where N defines the number of lines of the image pickup elements of the rolling shutter type (N is an even number), and d defines an exposure start lag time between lines. The delay amount D in Equation (2) is the delay amount D1, and the shutter speed S in Equation is the shutter speed S1.

$$\text{Delay Amount } D=(\text{Frame Cycle } T-\text{Shutter Speed } S)/2-d\times(N-1)/2 \text{ [sec]} \qquad (2)$$

According to the second exemplary embodiment, it is possible to synchronize the captured image, the display image, and the position and orientation information with each other even in such a system that the image pickup elements of the global shutter type and the image pickup elements of the rolling shutter type are mixedly provided. Of course, the present disclosure is not limited to the second exemplary embodiment. For example, the present disclosure is also applicable to a case where all of the image pickup elements are of the rolling shutter type, or to a case where the number of lines of image pickup elements is an odd number. The Equation for calculation of the delay amount is not limited to Equation (2), and can be modified to another Equation as appropriate. Further, for example, in a case where a subject to be noted is not at the center of the image, it can be so configured that the vertical synchronizing signal for imaging 135 and the vertical synchronizing signal for imaging 145 are generated so that the center of the subject becomes at the central point of the exposure time period.

As described above, the imaging and displaying system 1 according to the first and second exemplary embodiments is capable of improving the precision of overlapping the CG image onto the background image by synchronization control of the captured image, the display image, and the position and orientation information. Further, the imaging and displaying system 1 according to the first and second exemplary embodiments is capable of theoretically preventing the stuttering of a long second period, thereby making it possible to present an MR image with higher precision and more comfortability to the HMD wearer.

The exemplary embodiments described above are merely examples of how to embody the present exemplary embodiment in practice, and should not be construed as limiting the technical scope of the present exemplary embodiment. That is, the present exemplary embodiment can be put into practice in various ways without going beyond the technical concept or the main characteristics thereof.

For example, while the exemplary embodiments exemplify the cases where the position and orientation information include the information about the position and the orientation of the imaging and displaying device 10 in the three-dimensional space detected by the position and orientation sensor 120, only one of the position and the orientation can be dealt with. Further, the present exemplary embodiment is also applicable to a case where information of at least one of a motion, a position, and an orientation of the imaging and displaying device 10 in the three-dimensional space is dealt with.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-026496, filed Feb. 18, 2019, which is hereby incorporated by reference herein in its entirety.

What is claimed is:

1. A device comprising:
one or more image pickup elements configured to sequentially capture images;
a detection unit configured to sequentially detect a position and an orientation of the device;
one or more display elements configured to sequentially display composite images of the captured images and virtual images generated based on the detected position and orientation; and
a control unit configured to perform such control that a timing of sequential image capturing by the one or more image pickup elements is synchronized with a timing of sequential detection by the detection unit, and a cycle length of the sequential image capturing is equal to a cycle length of the sequential detection or an integral multiple of the cycle length of the sequential detection.

2. The device according to claim 1, wherein the control unit is configured to perform such control that the timing of sequential detection by the detection unit is synchronized with a timing of sequential display by the one or more display elements, and the cycle length of the sequential detection is equal to a cycle length of the sequential display or an integer division of the cycle length of the sequential display.

3. The device according to claim 1, wherein the control unit is configured to perform such control that the timing of sequential image capturing corresponding to a certain point in an exposure time period of the one or more image pickup elements is synchronized with the timing of sequential detection, which is a timing for outputting or updating detection information by the detection unit.

4. The device according to claim 3, wherein the certain point in the exposure time period is a central point or a centroid of the exposure time period.

5. The device according to claim 1, wherein the control unit is configured to control the image capturing timing in such a way that the relative relationship between the phases and the cycle lengths of the image capturing timing and a exposure time is maintained, even in a case where a exposure time period of the one or more image pickup elements is changed during imaging.

6. The device according to claim 1, wherein the control unit is configured to add time information regarding the image capturing timing to captured images captured by the one or more image pickup elements.

7. The device according to claim 1, wherein the control unit is configured to add time information regarding the detection timing to detection information obtained by the detection unit.

8. The device according to claim 1, wherein the image pickup elements are at least two image pickup elements and the device is configured to form a stereoscopic image from images captured by the at least two image pickup elements.

9. The device according to claim 1, wherein the control unit includes a phase synchronization unit configured to generate a signal that is phase-synchronized with a vertical synchronization signal of an image, the signal serving as a timing control signal that controls the phases and the cycle lengths.

10. The device according to claim 9, wherein the control unit further includes a delay unit configured to delay the vertical synchronization signal based on a delay amount of the image at least based on a frame cycle.

11. A device comprising:
one or more image pickup elements configured to sequentially capture images;
a detection unit configured to detect a position and an orientation of the device;
one or more display elements configured to sequentially display composite images of the captured images and virtual images generated based on the detected position and orientation and
a control unit configured to perform such control that a timing of sequential detection by the detection unit is synchronized with a timing of sequential display by the one or more display elements, and a cycle length of the sequential detection is equal to a cycle length of the sequential display or an integer division of the cycle length of the sequential display.

12. The device according to claim 11, wherein the control unit is configured to perform such control that the timing, which is a timing for outputting or updating detection information by the detection unit, is synchronized with the timing corresponding to a certain point in a display time period of the display element.

13. The device according to claim 12, wherein the certain point in the display time period is a central point or a centroid of the display time period.

14. The device according to claim 11, wherein the display elements are two display elements and the two display elements are configured to display a stereoscopic image.

15. A synchronization control method for a device including one or more image pickup elements configured to sequentially capture images, the synchronization control method comprising:
detecting, sequentially a position and an orientation of the device;
displaying, sequentially display composite images of the captured images and virtual images generated based on the detected position and orientation; and
controlling, wherein the controlling performs such control that timing of sequential image capturing by the one or more image pickup elements is synchronized with timing of sequential detection by the detecting, and a cycle length of the sequential image capturing is equal to a cycle length of the sequential detection or an integral multiple of the cycle length of the sequential detection.

16. The synchronization control method according to claim 15,
wherein the device further includes one or more display elements, and
wherein the controlling performs such control that the timing of sequential detection by the detecting is synchronized with a timing of sequential display by the one or more display elements, and the cycle length of the sequential detection is equal to a cycle length of the sequential display or an integer division of the cycle length of the sequential display.

17. A synchronization control method for a device including one or more image pickup elements configured to sequentially capture images, the synchronization control method comprising:
detecting a position and an orientation of the device;
displaying, sequentially composite images of the captured images and virtual images generated based on the detected position and orientation; and
controlling, wherein the controlling performs such control that timing of sequential detection by the detecting is synchronized with timing of sequential display by the one or more display elements, and a cycle length of the sequential detection is equal to a cycle length of the sequential display or an integer division of the cycle length of the sequential display.

* * * * *